United States Patent
Strauss et al.

(10) Patent No.: US 7,681,592 B2
(45) Date of Patent: Mar. 23, 2010

(54) THREE-WAY POPPET VALVES WITH FLOATING SEAT

(75) Inventors: Randall James Strauss, Woodland Park, CO (US); James A. Peña, Encinitas, CA (US); Tibor Kiss, Manitou Springs, CO (US); John Mathew Quinlan, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 484 days.

(21) Appl. No.: 11/715,158

(22) Filed: Mar. 6, 2007

(65) Prior Publication Data

US 2007/0267076 A1  Nov. 22, 2007

Related U.S. Application Data

(60) Provisional application No. 60/779,621, filed on Mar. 6, 2006.

(51) Int. Cl.
*F16K 11/044* (2006.01)
*F15B 13/04* (2006.01)
(52) U.S. Cl. ............... 137/625; 137/625.65; 137/627.5
(58) Field of Classification Search .............. 137/625, 137/625.65, 627.5
See application file for complete search history.

(56) References Cited

U.S. PATENT DOCUMENTS

| | | | | |
|---|---|---|---|---|
| 2,373,537 A | * | 4/1945 | Camfield | 137/625.24 |
| 2,751,923 A | | 6/1956 | Towler et al. | |
| 3,031,235 A | * | 4/1962 | Schwartz | 137/625.66 |
| 3,415,284 A | * | 12/1968 | Stampfli | 137/625.66 |
| 3,646,969 A | * | 3/1972 | Stampfli | 137/627.5 |
| 3,776,275 A | | 12/1973 | Updike | |
| 3,815,634 A | * | 6/1974 | Dowdall et al. | 137/627.5 |
| 3,910,314 A | * | 10/1975 | Nicholson | 137/625.62 |
| 3,955,597 A | * | 5/1976 | Oneyama et al. | 137/625.25 |
| 3,990,468 A | * | 11/1976 | Arvin et al. | 137/625.66 |
| 4,175,587 A | * | 11/1979 | Chadwick et al. | 137/625.65 |
| 4,332,368 A | | 6/1982 | Woloszczuk | |

(Continued)

FOREIGN PATENT DOCUMENTS

EP   0 621 426 A1   10/1994

(Continued)

*Primary Examiner*—John Rivell
(74) *Attorney, Agent, or Firm*—Blakely Sokoloff Taylor & Zafman LLP

(57) ABSTRACT

Three-way poppet valves having a poppet valve body, first and second poppet valves disposed in a valve guide within the body for motion between first poppet valve open and first poppet valve closed positions, a first poppet valve seat disposed in the poppet valve body so as to have freedom in a plane perpendicular to the poppet valve axis, the first poppet valve, when moving to the closed position, engaging the first poppet valve seat and centering the first poppet valve seat with respect to the first poppet valve, and when in the closed position, holding the first poppet valve seat against the poppet valve body, and a second poppet valve connected with the first poppet valve, the poppet valve body having a second poppet valve seat, the second poppet valve being in the closed position when the first poppet valve is in the open position and being in the open position when the first poppet valve is in the closed position.

14 Claims, 2 Drawing Sheets

U.S. PATENT DOCUMENTS

| | | | |
|---|---|---|---|
| 4,815,699 A * | 3/1989 | Mueller | 251/129.11 |
| 4,961,560 A * | 10/1990 | Ellett | 251/63.5 |
| 5,207,059 A | 5/1993 | Schexnayder | |
| 5,351,601 A | 10/1994 | Zeuner et al. | |
| 5,396,926 A * | 3/1995 | Pataki et al. | 137/625.65 |
| 5,460,329 A | 10/1995 | Sturman | |
| 5,463,996 A | 11/1995 | Maley et al. | |
| 5,485,957 A | 1/1996 | Sturman | |
| 5,497,806 A * | 3/1996 | Swank et al. | 137/625.65 |
| 5,673,669 A | 10/1997 | Maley et al. | |
| 5,697,342 A | 12/1997 | Anderson et al. | |
| 5,970,956 A | 10/1999 | Sturman | |
| 6,012,644 A | 1/2000 | Sturman et al. | |
| 6,038,957 A | 3/2000 | Ertmann et al. | |
| 6,082,332 A | 7/2000 | Hefler et al. | |
| 6,085,991 A | 7/2000 | Sturman | |
| 6,161,770 A | 12/2000 | Sturman | |
| 6,170,524 B1 | 1/2001 | Gray, Jr. | |
| 6,174,219 B1 | 1/2001 | Mathews | |
| 6,257,499 B1 | 7/2001 | Sturman | |
| 6,360,728 B1 | 3/2002 | Sturman | |
| 6,371,382 B1 | 4/2002 | Niethammer et al. | |
| 6,425,375 B1 | 7/2002 | Hefler et al. | |
| 6,655,602 B2 | 12/2003 | Shafer et al. | |
| 6,715,694 B2 | 4/2004 | Gebhardt | |
| 6,918,409 B1 | 7/2005 | Parker | |
| 7,032,574 B2 | 4/2006 | Sturman | |
| 2002/0029765 A1 | 3/2002 | Giavi et al. | |
| 2004/0149264 A1 | 8/2004 | Pecheny et al. | |
| 2004/0188537 A1 | 9/2004 | Sturman | |
| 2004/0238657 A1 | 12/2004 | Sturman | |

FOREIGN PATENT DOCUMENTS

| | | |
|---|---|---|
| FR | 2180789 | 11/1973 |
| GB | 631750 | 11/1949 |
| GB | 2 352 798 A | 2/2001 |

* cited by examiner

THREE-WAY POPPET VALVES WITH FLOATING SEAT

CROSS-REFERENCE TO RELATED APPLICATION

This application claims the benefit of U.S. Provisional Patent Application No. 60/779,621 filed Mar. 6, 2006.

BACKGROUND OF THE INVENTION

1. Field of the Invention

The present invention relates to the field of three-way poppet valves.

2. Prior Art

An object of the preferred embodiment of the present invention is to have a high pressure (for fuel) three-way valve with low leakage, good pressure balance (for minimal force requirements) and practical manufacturing. While the valve of the present invention has other uses, the preferred embodiment is intended for use in fuel injector for fuel injected engines, and the prior art will be discussed primarily with respect to such use.

"Conventional" two-way needle control valves to control the motion of a diesel injector's needle valve have been in use for quite some years. They provide acceptable but not superior controllability with relatively low cost. On the other hand, needle control with three-way valves has not been commercialized to the same extent. Three-way control valves provide superior flexibility in controlling the needle motion but are difficult to manufacture and/or to achieve pressure balance.

It is a very simple task to achieve pressure balance with a two-way valve but more difficult with a three-way valve. It is also simple to achieve pressure balance with three-way valves if a spool valve is used, but a spool valve leaks excessively if used with fuel at elevated pressures as required for fuel injected engines. Therefore most needle valve control is achieved by using a two-way poppet valve.

Direct needle control with two-way valves is relatively simple and low cost. However, the flexibility in controlling the needle motion during both opening and closing through the entire pressure range is not optimal, since there is no specific orifice to control the opening rate and closing rate independently, as is the case with a three-way valve.

U.S. Pat. Nos. 5,463,996, 5,673,669 and 5,697,342 show three-way poppet valves used in fuel injectors, with the valves using the valve element to center the second seat. However, none of the valves are able to achieve the pressure balance of the present invention.

DETAILED DESCRIPTION OF THE PREFERRED EMBODIMENTS

The object of the preferred embodiments of the present invention is to have a high pressure (for fuel) three-way valve with low leakage, good pressure balance (for minimal force requirements) and practical manufacturing. Accordingly the present invention comprises a three-way poppet valve that achieves hydraulic pressure balance in either the open or closed position. In order to achieve this, the poppet seat that is not part of (or located on) the main guide must be perfectly concentric with the main guide. If this is not achieved, the valve seat will not properly seat on the misaligned seat and will either not seal, or stick, or both. While this can easily be drawn or designed, it is not practical to manufacture. The present invention uses a floating seat that is easily manufactured and does not need to be perfectly concentric with the valve guide. Instead, the seat is allowed to "float" to find the optimum location, resulting in excellent sealing and minimal stiction. The required force is minimal, which is also key in minimizing the size of the actuator (such as a magnetic armature), further improving performance and packaging practicality.

Figure 1:
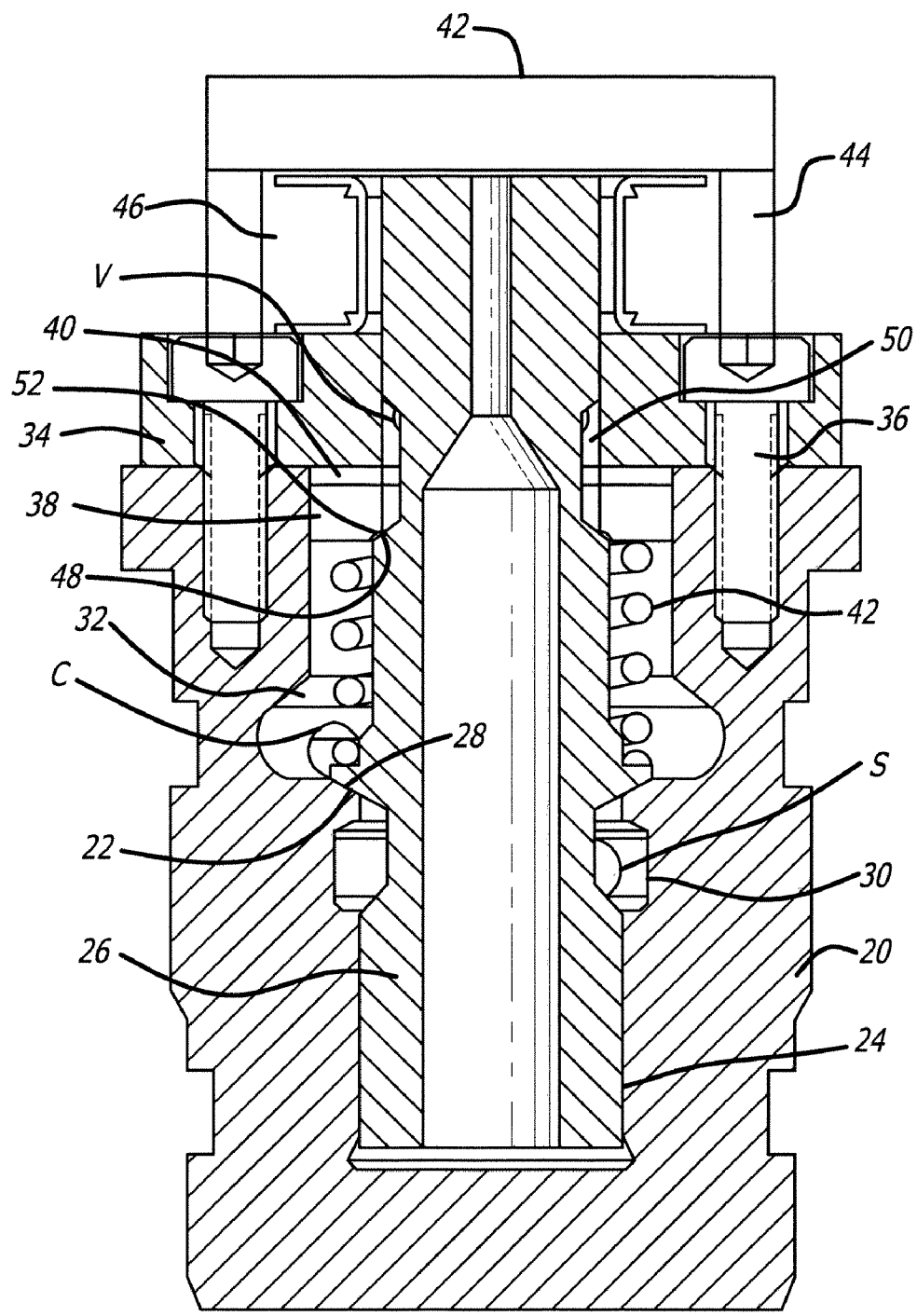
FIG. 1 is a drawing of a preferred embodiment of a three-way poppet valve in accordance with the present invention.

Referring to FIG. 1, a preferred embodiment of the present invention may be seen. As shown therein, a valve housing 20 defines a valve seat 22 in a bore 24, within which valve member 26 may slide. The valve member 26, itself, has a poppet valve surface 28, which when the valve member 26 is in the position shown in the Figure, mates with valve seat 22 to seal region 30 with respect to region 32. A cap member 34 is bolted by bolts 36 to the top of the valve body 20, capturing floating seat 38 and member 40 therebelow. The uppermost position of the valve seat member is defined by member 40, with coil spring 42 acting between the back of poppet valve 28 and floating seat 38 to hold the floating seat 38 and member 40 in the uppermost position.

The particular embodiment shown in FIG. 1 uses a magnetic valve member 26, with top 42, annular member 44 and cap 34 also being magnetic so that a solenoid coil 46 may be used to move valve member 26 upward to lift poppet valve 28 off of valve seat 22 to couple region 32 to region 30 and force poppet valve surface 48 against cooperatively disposed valve surface on floating seat 38. Thus when the valve is in the position shown in FIG. 1, region 32 is in fluid communication with region 50 and sealed with respect to region 30, though when a current is passed through the solenoid coil 46, valve member 26 moves upward to seal region 50 from region 32 and couple region 32 to region 30. In a typical control application, region 30 is coupled to a source of fluid under pressure through port S, region 32 is coupled to a control port C and region 50 is coupled to a vent port V. With this connection, the control port C, such as may be coupled to control an actuator, may be coupled to the source of fluid under pressure or to the vent. While the double poppet valve may provide a momentary direct flow path from the port S coupled to a source of fluid under pressure and the port V coupled to a vent, in many applications if not most, the time duration of this short circuit is small, particularly when compared to the time each of the poppet valves is closed, so that the very low leakage characteristic of a poppet valve more than makes up for the momentary short circuit in comparison to some other valve types, such as spool valves. Thus a three-way poppet valve is provided, coupling a first region to a second region when in one position and the first region to a third region when in a second position. In accordance with the invention, floating seat 38 is provided with some radial clearance within the valve body 20 so as to be self-centering as further described below. This allows the floating seat 38 to find its best position without requiring extreme manufacturing tolerances to assure that the two poppet valve seats are perfectly coaxial. In particular, the second poppet valve seat may be formed when the valve guide bore 24 in the valve body is formed, assuring concentricity of the two. However the first poppet valve seat is not easily made concentric if rigidly attached to the poppet valve body because it cannot be made integral (simultaneously, or same operations) with the poppet valve body, but must be positioned by a cap or other structure fastened to the poppet valve body for assembly reasons.

The floating seat 38 must seal in two places. The first seal takes place between the conical (or spherical) poppet valve surface 48 and the seat surface 52 of floating seat 38. For this reason the floating seat 38 must float to locate the perfect concentric location, allowing the two seats to work effectively. As the floating seat 38 moves to that optimal location, the floating seat 38 must be able to seal the control chamber against very high pressure, yet be able to freely move so as to self-align with valve member 26. This is accomplished by lapping (flat) the reverse side of the floating seat 38 and letting it seal against the lapped fixed surface of the structure of the valve. Lapped metal surfaces are commonly used to seal extremely high pressures in fuel injectors. Typically, these lapped surfaces are clamped together to oppose the separating forces created by the very high fuel pressures in the assembly. This invention uses one of these existing lapped surfaces to create an effective location to seal the floating seat 38. Unlike typical lapped surface seals for which sealing is accomplished by clamping the parts together, the floating seat 38 is not clamped. If it were, it could not float and it would not self-align. Instead, the floating seat 38 is moved by the valve member 26 (seat to seat contact during which self-alignment takes place) onto the lapped to lapped surface. At that point the pressure build-up in the control chamber 32 will "clamp" the floating seat 38 into place and the lapped to lapped surface will seal effectively. The higher the pressure in region 32, the higher the "clamping" force. Another way of stating this is that the lapped to lapped floating seat 38 is a pressure unbalanced valve seat member, with the pressure differential between regions 32 and 50 causing greater imbalance and more tightly sealing the seats. By letting the floating seat use the existing lapped surface of the assembly structure and by letting the seat freely move, the result is a very practical high pressure three-way poppet valve. Also the two poppet seats may be sized to achieve pressure balance, a pressure balance so that relative modest valve actuation forces may be used.

Figure 2A:
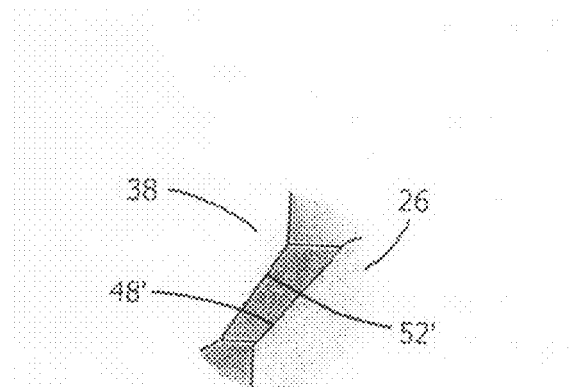
FIG. 2a illustrates a conical poppet valve surface 48' and a conical seat surface 52' on the floating seat 38.
Figure 2B:
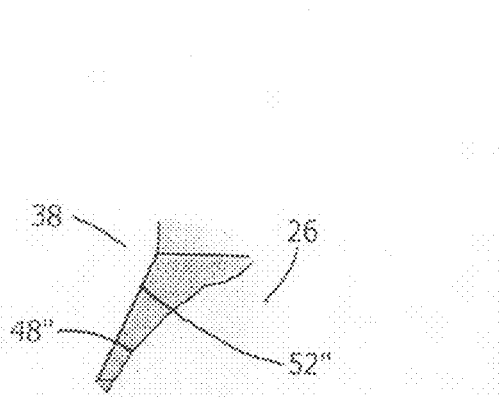
FIG. 2b is a Figure similar to FIG. 2a, though illustrating the combination of a conical seat surface 52" on floating seat 38 in combination with a spherical poppet valve surface 48" on valve member 26.
Figure 2C:
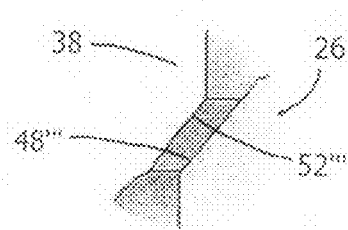
FIG. 2c a combination of a conical poppet valve surface 48''' in combination with a spherical seat surface 52''' on floating seat 38.

The specific shape of the seat surface 52 on the floating seat 38 and the poppet valve surface 48 on the valve member 26 are shown relatively schematically in FIG. 1. These surfaces may take various shapes, such as by way of example, as illustrated in FIGS. 2a through 2c. FIG. 2a specifically illustrates a conical poppet valve surface 48' and a conical seat surface 52' on the floating seat 38. As may be seen in the Figure, the included angles of the two cones are intentionally made different in a preferred embodiment so as to define the diameter of the mating surface when valve member 26 is its uppermost position. In the embodiment illustrated in FIG. 2a, the included angle on the poppet valve surface 48 is greater than the included angle on the seat surface 52 of the floating seat 38, causing a sealing diameter for the valve equal to the outer diameter of the poppet valve surface 48', which is relatively invariant with wear of the seat surfaces. The cone angles, of course, are selected so that the seat surface 52 will be self-centering, as required by motion of the floating seat 38.

FIG. 2b is a Figure similar to FIG. 2a, though illustrating the combination of a conical seat surface 52" on floating seat 38, in combination with a spherical poppet valve surface 48" on valve member 26. The advantage of using a spherical surface for one of the valve surfaces is that the same accommodates angular misalignment between the axis of the valve member 26 and, in the case of the embodiment of FIG. 2b, the axis of the conical seat surface 52" of the floating seat 38. The disadvantage of such a configuration is that the hydraulic area of the poppet valve will tend to change as the two valve surfaces wear. Finally, in FIG. 2c the combination of a conical poppet valve surface 48''' in combination with a spherical seat surface 52''' on floating seat 38 is shown. (The spherical character of seat surface 52''' is a bit difficult to illustrate or see because of the shortness of the spherical arc.)

The invention combines the following attributes:

1. Relatively simple three-way valve with low leakage.
2. Low cost due to relative simplicity of the valve.
3. Small force requirements due to very balanced configuration.
4. Low stiction on all seats.
5. Self-aligning seat reduces the manufacturing prevision required for a three-way poppet valve.
6. Applicable to either normally open or normally closed valves.
7. Scalable due to excellent pressure balance.

The valve can be configured to use various types of magnetic or other actuators. Also, the spring can be a wave spring to reduce the volume of region 32 which may improve injector operation.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A three-way poppet valve assembly comprising:
   a poppet valve body;
   a first poppet valve disposed in a valve guide within the body for linear motion along a poppet valve axis in a valve guide between first poppet valve open and first poppet valve closed positions;
   a first poppet valve seat, the first poppet valve seat being disposed in the poppet valve body so as to have freedom in a plane perpendicular to the poppet valve axis to be self centering when the first poppet valve contacts the first poppet valve seat when moving to the first poppet valve closed position, and when in the closed position, holding the first poppet valve seat against the poppet valve body;
   a second poppet valve connected to the first poppet valve, the poppet valve body having a second poppet valve seat, the second poppet valve being in the closed position when the first poppet valve is in the open position and being in the open position when the first poppet valve is in the closed position.

2. The poppet valve assembly of claim 1 wherein the poppet valve seat is held against the poppet valve body by a spring when the poppet valve is in the poppet valve open position.

3. The poppet valve assembly of claim 1 wherein the second poppet valve seat is integral with the poppet valve body.

4. The three-way poppet valve assembly of claim 1 wherein the second poppet valve seat and a mating surface of the second poppet valve are conical surfaces having different cone included angles.

5. The three-way poppet valve assembly of claim 1 wherein the first poppet valve seat and a mating surface of the first poppet valve are conical surfaces having different cone included angles.

6. The three-way poppet valve assembly of claim 1 wherein the first poppet valve seat is a spherical valve seat and a mating surface of the first poppet valve is a conical surface.

7. The three-way poppet valve assembly of claim 1 wherein the first poppet valve seat is a conical valve seat and a mating surface of the first poppet valve is a spherical surface.

8. A three-way poppet valve assembly comprising:

a poppet valve body;

first and second poppet valves disposed in a valve guide within the body for linear motion along a poppet valve axis between first poppet valve open and first poppet valve closed positions;

a first poppet valve seat, the first poppet valve seat being disposed in the poppet valve body so as to have freedom in a plane perpendicular to the poppet valve axis;

the first poppet valve, when moving to the closed position, engaging the first poppet valve seat and centering the first poppet valve seat with respect to the first poppet valve, and when in the closed position, holding the first poppet valve seat against the poppet valve body;

a second poppet valve integral with the first poppet valve, the poppet valve body having a second poppet valve seat, the second poppet valve being in the closed position when the first poppet valve is in the open position and being in the open position when the first poppet valve is in the closed position.

9. The three-way poppet valve assembly of claim 8 wherein the poppet valve seat is held against the poppet valve body by a spring when the poppet valve is in the poppet valve open position.

10. The three-way poppet valve assembly of claim 8 wherein the second poppet valve seat is integral with the poppet valve body.

11. The three-way poppet valve assembly of claim 8 wherein the second poppet valve seat and a mating surface of the second poppet valve are conical surfaces having different cone included angles.

12. The three-way poppet valve assembly of claim 8 wherein the first poppet valve seat and a mating surface of the first poppet valve are conical surfaces having different cone included angles.

13. The three-way poppet valve assembly of claim 8 wherein the first poppet valve seat is a spherical valve seat and a mating surface of the first poppet valve is a conical surface.

14. The three-way poppet valve assembly of claim 8 wherein the first poppet valve seat is a conical valve seat and a mating surface of the first poppet valve is a spherical surface.

* * * * *